June 4, 1935.　　　　H. A. HAYDEN　　　　2,003,591
SELF LOCKING NUT
Filed June 8, 1934
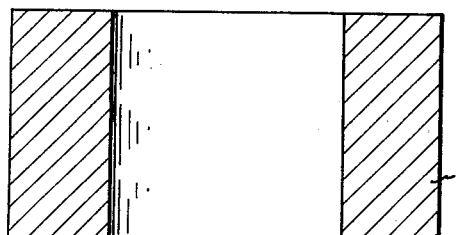
Fig. 5
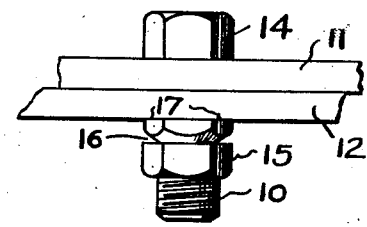
Fig. 1
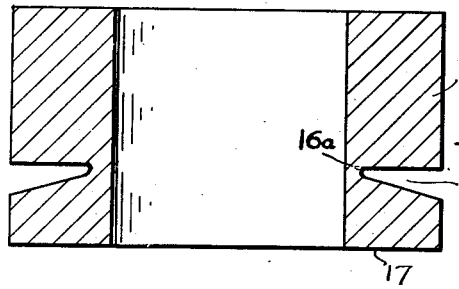
Fig. 6
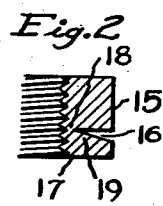
Fig. 2
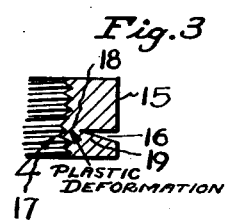
Fig. 3
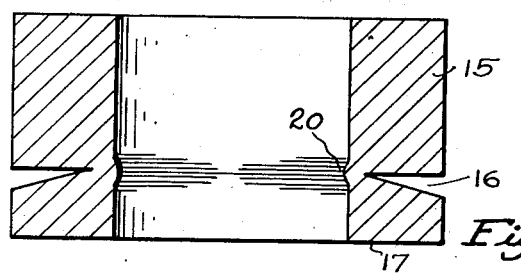
Fig. 7
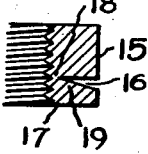
Fig. 4
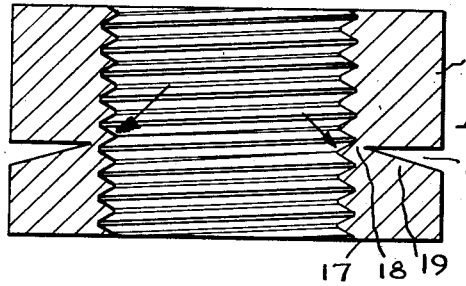
Fig. 8
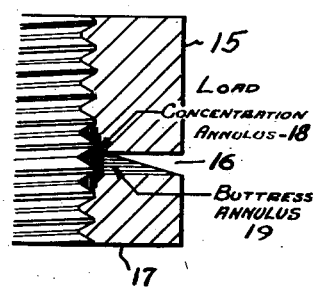
INVENTOR.
Howard A Hayden
BY Daniel G Cullen
ATTORNEY.

Patented June 4, 1935

2,003,591

UNITED STATES PATENT OFFICE 2,003,591

SELF LOCKING NUT

Howard A. Hayden, Detroit, Mich.

Application June 8, 1934, Serial No. 729,598

2 Claims. (Cl. 151—21)

The inventions of this application relate to self-locking nuts and to methods of making self-locking nuts.

One invention provides a self-locking nut which is made in one piece and can be tightened with a wrench in the usual fashion. Because of these characteristics, the nut is inexpensive of manufacture and convenient of use, and yet functions perfectly for the purposes of maintaining itself locked in place upon the bolt onto which it is threaded.

Another invention provides an improved method of manufacturing a self-locking nut, one which can be carried out in an inexpensive yet satisfactory fashion.

Other features and inventions will be readily apparent to those skilled in the art upon reference to the following detailed descriptive matter which relates to the appended drawing. In this drawing, Figure 1 shows a self-locking nut of the invention in use;

Figures 2 and 3 are partial sections of the self-locking nut of Figure 1 before and after the nut is tightened up on the bolt onto which it is threaded;

Figure 4 is an enlarged fragmentary section of a self-locking nut of the invention, shaded to indicate different annuli thereof which are important to consider;

Figures 5, 6, 7, and 8 show a self-locking nut of the invention in its various stages of manufacture.

The nut

In Figure 1 there is shown a bolt 10 which passes through parts 11 and 12 which are to be secured to each other by means of the bolt. The bolt is provided with the usual head 14, and a nut 15 is threaded onto the bolt to create the fastening for which the bolt is intended.

The nut 15 is a self-locking nut and differs from conventional nuts in the provision of an annular groove 16. The latter is shown as being in the shape of a half V in cross-section, but it is here pointed out and to be expressly understood that other cross-sections such as a full V, a rounded half V, a rounded full V, a half U, a full U, etc. might be utilized with results that might be of the same kind, though not quite as satisfactory as the results obtained by using the half V form shown.

What happens when the nut is tightened onto the bolt

In order to aid in an understanding of the operation of the self-locking nut, the following analysis of what I now believe happens when the nut is tightened onto the bolt will now be offered.

When the nut 15 is tightened up, the load borne by the threads most remote from the bearing or engaged or load face 17 of the nut is transmitted to that face of the nut through a load concentration annulus 18, between the base of the groove 16 and the threaded bore of the nut. The concentration of the load in this annulus causes a plastic deformation of this annulus, because of the fact that the annulus is so small, with respect to the load borne by the threads most remote from the load face of the nut, that the unit stress in the annulus 18 is above the elastic limit of the nut metal.

Due to the fact that the groove 16 is in the form shown, the load concentration annulus 18 is buttressed and supported by a buttress annulus 19 of the nut. Therefore, the plastic deformation of the load concentration annulus is directed inwardly towards the bolt threads and the nut axis, and is evidenced by a visible plastic deformation of the nut, in the threaded bore thereof, near the load concentration annulus, as is made to appear in Figure 3. The plastic deformation of the nut at the load concentration annulus, being inside the nut bore, pinches the threads of the bolt at that annulus and causes self-locking.

The action of the nut may further be defined as the obtaining of a concentration of a greater or lesser part of the entire nut load into a small annular zone of the nut, to an extent sufficient to cause a plastic deformation of that load concentration zone, the zone being buttressed in such a way that the plastic deformation of that zone, due to that load, is directed inwardly into the nut bore in such a manner as to produce a deformation in the nut bore which serves to lock the nut in place on the bolt.

The foregoing may be analyzed in a different manner, substantially as follows: If the nut thread is a free fit or Class 2 thread, or a medium fit or Class 3 thread, (see Kent's "Mechanical Engineers' Hand Book", 1923, 10th edition, published by John Wiley & Sons, pages 1511–1515), as it will usually be, the plastic deformation of the nut within the bore at the load concentration annulus may be considered as converting the thread into a close fit or Class 4 thread. Since a thread of the latter fit may be and usually is provided with an allowable interference, ranging from .0001" to .0013", and to a very large extent, is a self-locking thread, the nut of the invention may be considered as a self-locking nut, not only by virtue of its actual performance, but also by virtue of the fact that a portion of its thread is converted into a close fit or Class 4 thread, despite the fact that the nut is originally manufactured with a free fit or Class 2 thread.

If the invention is viewed in this aspect, it will be readily seen that the action of tightening up the nut on the bolt onto which it is threaded may be considered as a method for converting a free fit or Class 2 thread into a close fit or Class 4 thread.

The invention may also be considered as a convenient method for producing a permanent deformation in the bore of a nut after the nut is threaded onto the bolt with which the nut is to be used, the deformation locking the nut in place on the bolt.

It has been observed that an important relation exists between the depth of the annular groove 16 and the remaining porportions of the nut. It is considered desirable to have the groove as deep as possible in order to have the load concentration annulus as small as possible, thereby insuring that the unit stresses therein will be above the elastic limit of the nut metal; however, it is also necessary to retain sufficient metal in the load concentration annulus to prevent breakage of the nut at that annulus due to torsion when the wrench is applied to the nut.

By way of example, the following dimensions will be offered to show what have actually been found to be satisfactory proportions for a commercially manufactured nut. If the nut thread be an S. A. E. standard ½", 20 pitch, fine thread (see Kent, page 1512) with its major diameter equal to .5000 inches, the diameter of the circle representing the base of the groove may be .5300 inches, leaving a thickness between the base of the groove and the base of the thread of .015 inches. The groove is placed about 6 threads down from the free face of the nut, or about 4 threads away from the load face of the nut, and its opening is of as small a width as possible, the actual width of the opening heretofore used in manufacturing nuts being such as would be obtained by having the groove angle 15 degrees.

It is also believed that when the nut is tightened up on the bolt, a permanent shortening of the nut as a whole takes place, with the consequence that the lead of the threads on one side of groove 16 is changed with respect to the lead of the threads on the other side of groove 16; this deformation of the nut causes the nut threads to grip the bolt threads more tightly than would otherwise be the case.

The method of manufacture

The nut shown and heretofore described may be manufactured in any suitable fashion. One satisfactory method of manufacturing the nut is shown in the appended drawing, and will now be described.

The nut, if a standard hex nut, is made from bar stock (Figure 5) of hexagonal cross-section, having a length slightly greater than the desired finished length of the nut. The stock is first drilled to the standard diameter for nuts of the size chosen. In the case of a fine thread, ½"-20 pitch nut, the drill diameter will be .4527 inches, for a ¾ thread (S. A. E. Handbook, 1929, page 309).

The nut is placed in a lathe and the annular groove 16 is turned therein with a tool which gives the groove 16 an angle of 15 degrees, a rounded base 16a and an opening whose width is slightly greater than that which the groove is desired to have in its final form. It is here observed that it is considered desirable to make this groove opening as small as possible, for economy of material, and to make the groove angle as small as possible to provide as much wrench bearing area as possible.

The nut is then compressed axially to reduce its thickness. Such compressing action flattens the groove 16 from the shape of Figure 6 to the shape of Figure 7, eliminating the rounded base 16a of the groove; this simultaneously produces a plastic deformation 20 of the nut, inwardly of the drilled hole, at the zone of the base of the groove 16.

It is here observed that the plastic deformation 20 produced in the nut during its manufacture, and by virtue of the compressing action heretofore described, is not to be confused with the previously described plastic deformation which occurs in the nut when the nut is tightened up on the bolt.

The manufacture of the nut is completed by tapping the drilled hole of the nut with a standard tap to provide the thread.

The thread or threads which are formed in the nut near the base of the groove 16, indicated by the arrows of Figure 8, are not like the threads which are formed in the nut at points remote from groove 16, but will be fuller than those threads. This is due to the fact that the plastic deformation 20, provided by the compressing action, makes the bore of the nut slightly undersized at the groove 16, and when this bore is tapped with a standard tap, the tap will produce there a fuller thread. For example, if the tap be for a ¾-full depth thread, most of the threads will be ¾, but the thread or threads at the deformation 20 will be ¾ plus, depending upon the extent of the plastic deformation 20. In other words, while the major part of the nut has a ¾ thread, that part of the nut near the groove 16 will have approximately a full thread. This is of advantage, not only because a full thread is more desirable than a ¾ thread, for gripping action, but in this case particularly because the full thread at this point is the thread that will be subjected to plastic deformation when the nut is tightened up. The locking action of the nut, due to the presence of the buttressed load concentration zone, is enhanced by the fact that the threads which are to be deformed when the nut is tightened up are approximately full threads, even though the nut itself is considered as having nothing more than a standard ¾ thread.

Now, having described a self-locking nut of the invention, as well as a method of producing the same, reference will be had to the following claims for a determination of the scope of the invention:

What I claim is:

1. For use with a male element initially having a substantially uniform exterior thread in order to form a locked thread assembly, a hollow female element initially having a substantially uniform interior thread designed for cooperation with the thread of the male element, the female element having a buttressed exterior peripheral groove, the relative proportions of the parts of the female element being such that the threads thereof near the base of the groove are automatically deformed inwardly, towards the axes of the threads by and in response to the action of threading the female element on the male element to lock the threads relatively, without causing relative movement of the parts of the female element on opposite sides of the groove in any but an axial direction.

2. For use with a male screw element projecting from an abutment part and initially having a substantially uniform exterior thread, and in order to form a locked thread assembly, a nut or female element threaded on said male element tightly against said abutment part and having planar surfaces, one of which engages a surface of said abutment part, said nut element initially having a substantially uniform thread, designed for co-operation with the thread of said male screw element, the nut having a buttressed exterior peripheral groove between the planar surfaces thereof, the relative proportions of the nut parts being such that the nut threads near the base of the groove are automatically deformed inwardly, towards the axes of the threads, by and in response to the action of threading the elements together to lock the threads relatively, without causing relative movement of the parts of the nut element on opposite sides of the groove in any but an axial direction, with the planar surfaces of the nut retaining their initial relation to the nut bore, even after the threading-on operation.

HOWARD A. HAYDEN.